Isaac Harter
Evan F. Wilson &
Ernest C. Huge
INVENTORS

Feb. 24, 1948.  I. HARTER ET AL  2,436,387
MULTIPLE ELECTRODE ARC WELDING
Filed Dec. 22, 1944  6 Sheets-Sheet 4
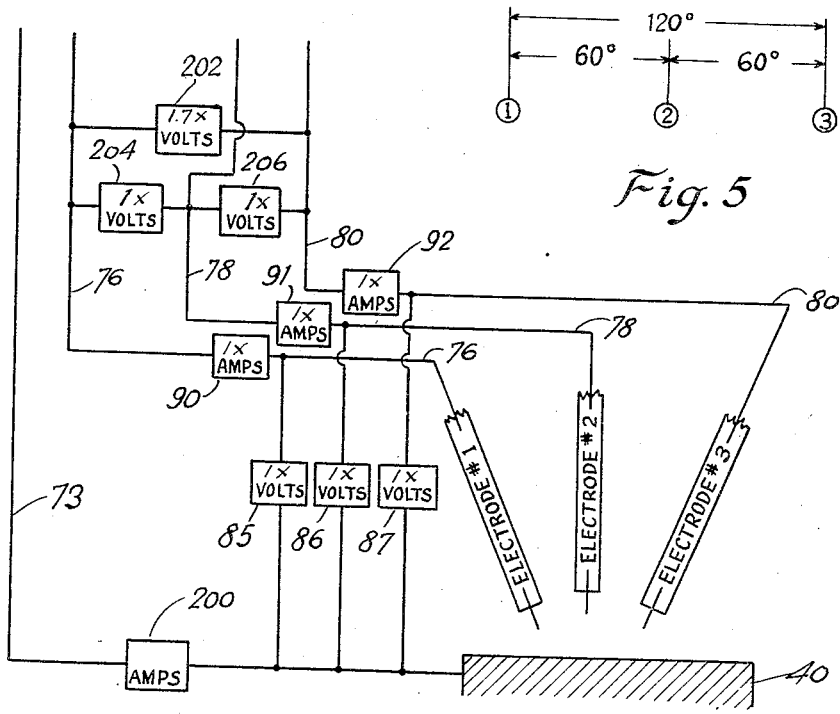
Fig. 5
60° PHASE RELATIONS
Fig. 4
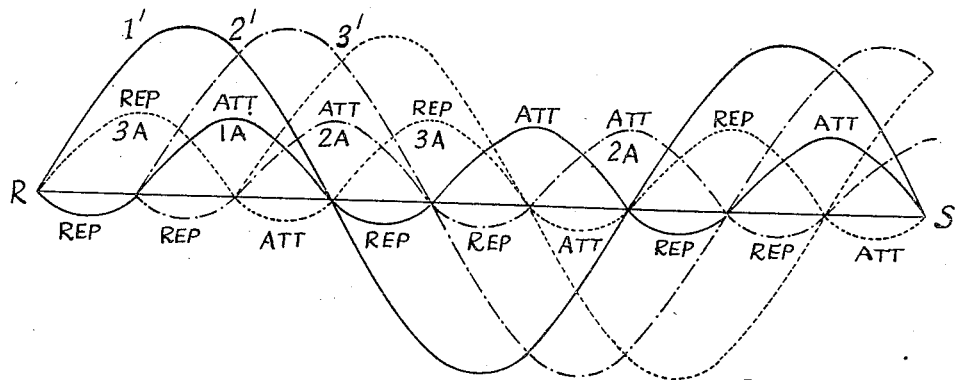
60° PHASE RELATIONS
Fig. 6
Isaac Harter
Evan F. Wilson &
Ernest C. Huge
INVENTORS
BY
*[signature]*
ATTORNEY

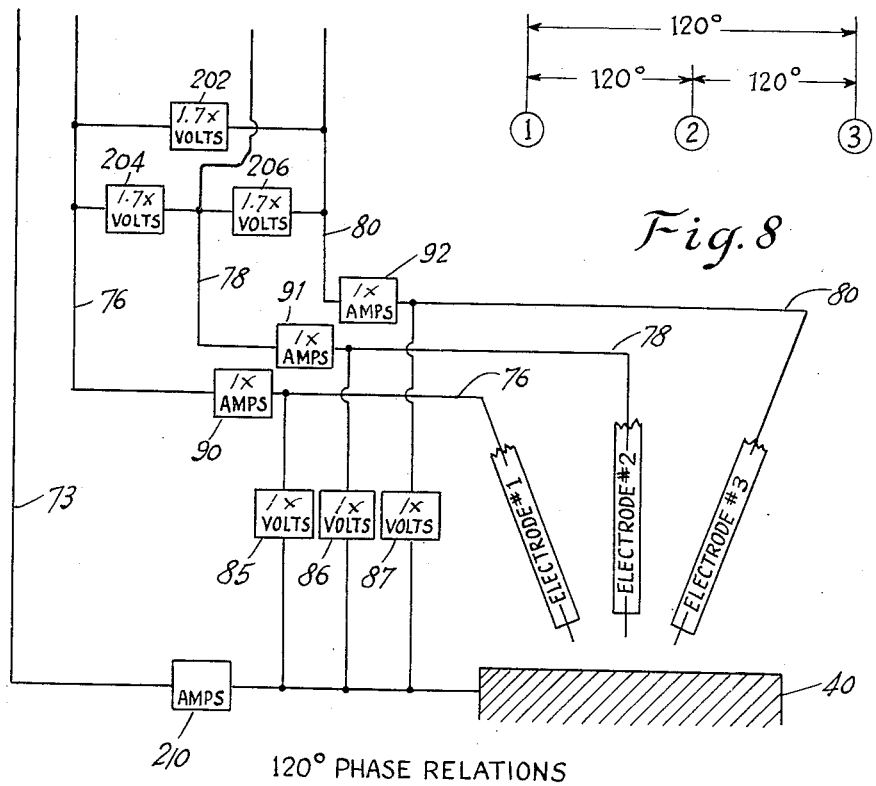
Fig. 8
Fig. 7
120° PHASE RELATIONS
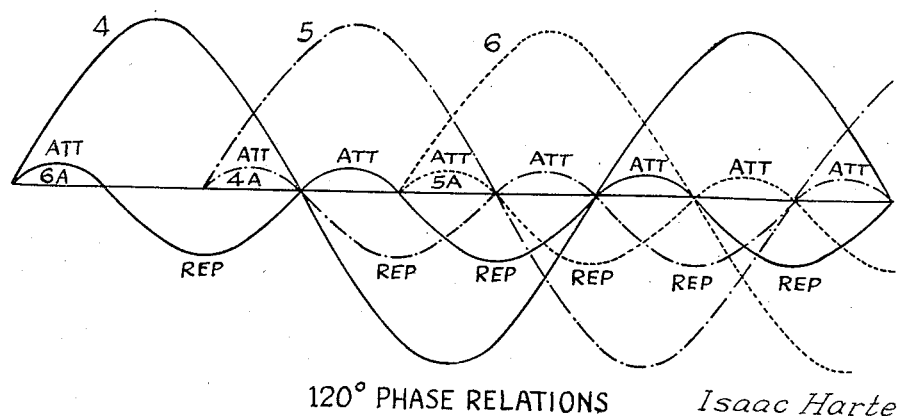
120° PHASE RELATIONS
Fig. 9
Isaac Harter
Evan F. Wilson &
Ernest C. Huge
INVENTORS
BY
ATTORNEY

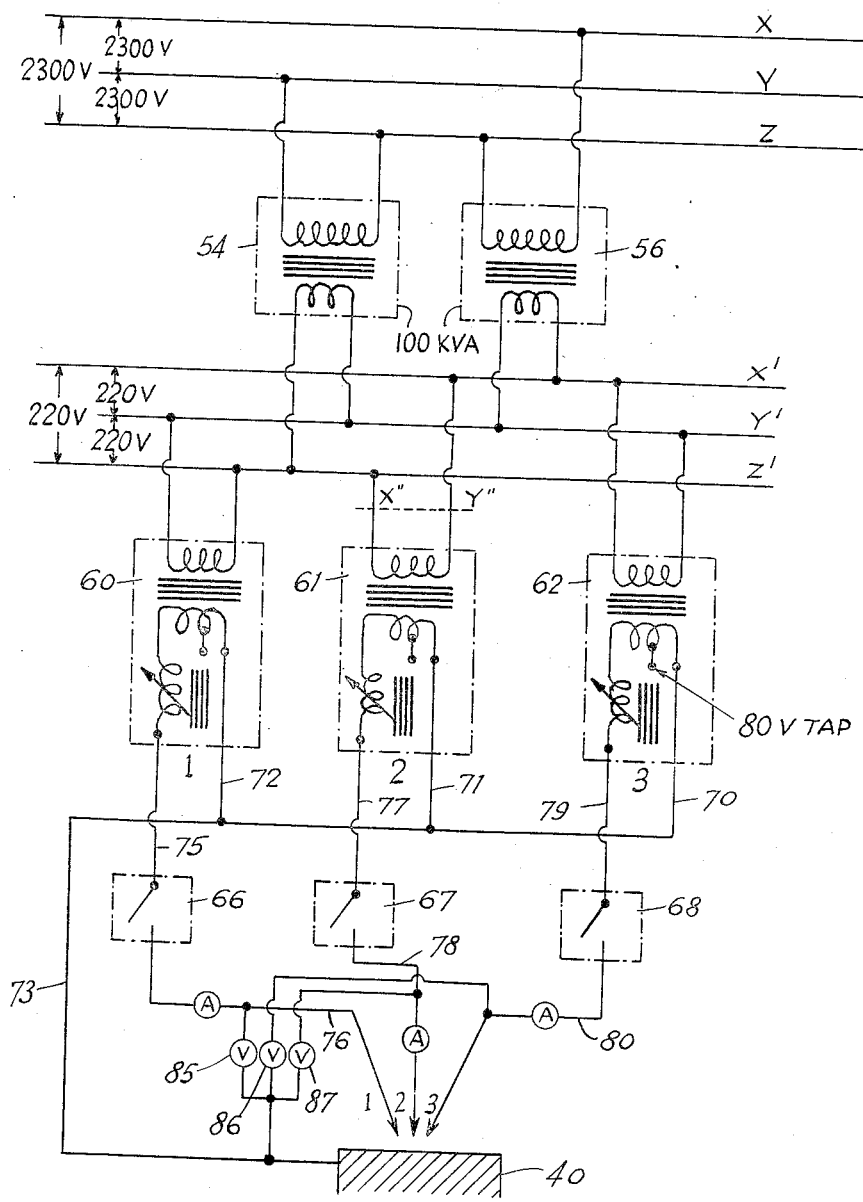

Patented Feb. 24, 1948

2,436,387

UNITED STATES PATENT OFFICE 2,436,387

MULTIPLE ELECTRODE ARC WELDING

Isaac Harter and Evan F. Wilson, Akron, and Ernest C. Huge, Barberton, Ohio, assignors to The Babcock & Wilcox Company, Rockleigh, N. J., a corporation of New Jersey Application December 22, 1944, Serial No. 569,320

10 Claims. (Cl. 219—8)

This invention relates to metallic arc welding. More particularly, the invention is concerned with improvements in arc welding wherein a plurality of metallic electrodes are simultaneously employed with phase-spaced arcs producing a pool of weld metal common to all of the arcs.

A general object of the invention is to so improve metallic arc welding processes as to effect increased deposits of weld metal per unit of time and unit of energy employed, and thereby reduce the overall cost of welding.

Among other objects of the invention is the attainment of a high thermal efficiency which permits the fusing of an increased amount of electrode metal per unit of power input.

Other objects of the invention include; a reduction of time required for slag removal between successive weld metal deposits; a reduction in the number of passes required for thick plate welding; and the reduction of weld defects.

The invention will be described with reference to the accompanying drawings some of which illustrate apparatus for effecting the method.

In the drawings:

Fig. 4 is a diagrammatic view indicating a multiple arc system in which the 60° phase relationship circuits are shown;

Fig. 5 is a diagrammatic view further indicating the arrangement of the electrodes in the 60° phase-relationship;

Fig. 6 shows a plurality of curves indicating the separate electrode current waves and the reactions between the various electrode currents involved in the system in which the arcs are 60° phase relationship;

Figs. 7, 8, and 9 pertain to the illustrative multiple arc system in which the respective electrode circuits are in 120° phase relationship and these figures are, respectively, similar in type and character to Figs. 4, 5, and 6; and Fig. 10 is a diagrammatic view showing the electrical hook-up for the multiple electrodes.

Figure 1:
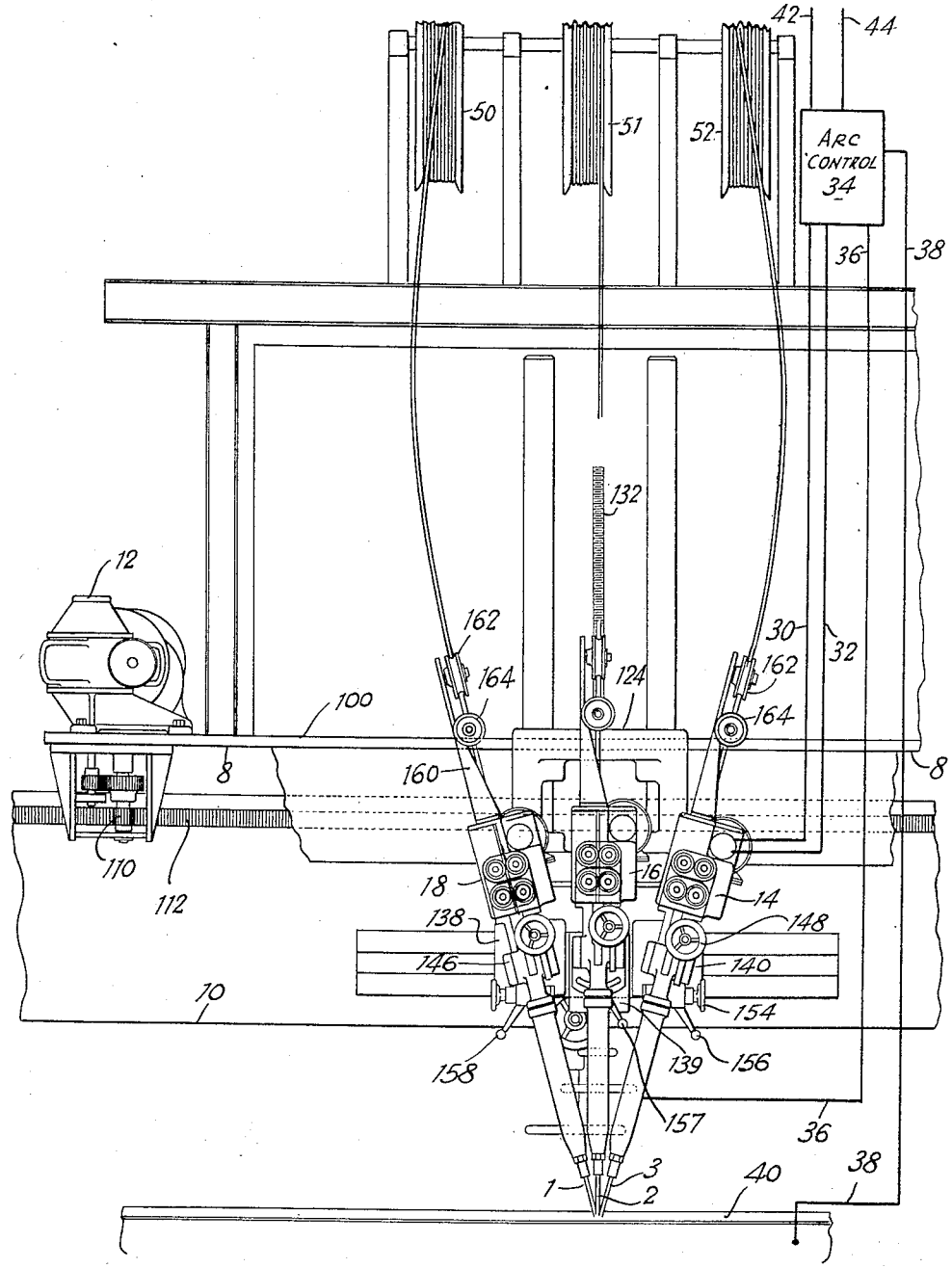
Fig. 1 is a front elevation of multiple metallic arc welding apparatus including phase-spaced electrodes.
Figure 2:
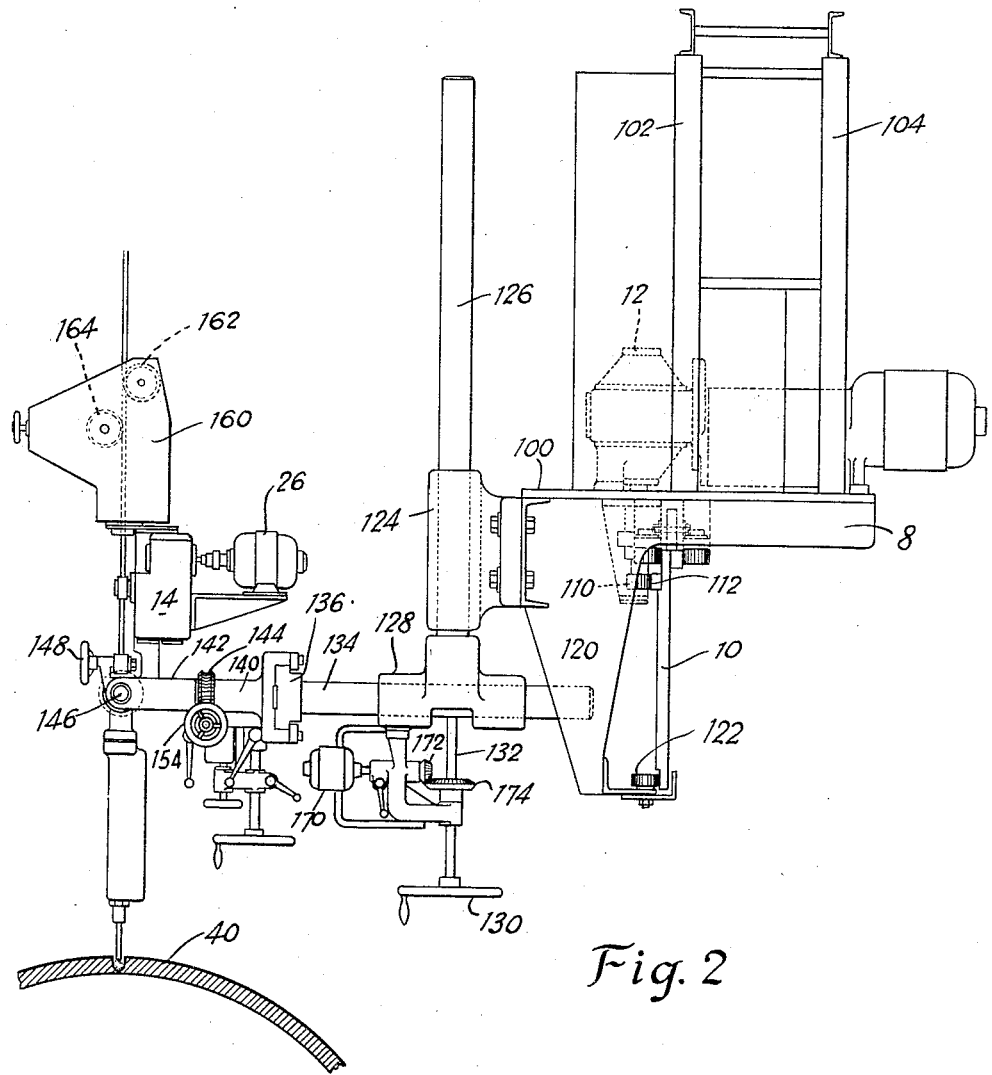
Fig. 2 is a side elevation of the apparatus illustrated in Fig. 1.

The apparatus indicated in Figs. 1, 2, and 10 is so constructed that a plurality of arcs can be run simultaneously. It involves a common drive carriage 8 which is traversed over a longitudinally extending fixed guide or support 10 by the combination gear head speed ranger 12. Three automatic welding heads 14, 16, and 18 are mounted to the carriage so as to maintain their metallic electrodes 1, 2 and 3 in downwardly converging relationship toward a common position along the weld zone. The electrode of each head is advanced by an independent drive mechanism including a motor such as that indicated at 26 in Fig. 2. Furthermore, each welding head drive mechanism has its own independent arc control by which the voltage of the arc and the rate of feed of the electrode are coordinated. For example, the feed of the electrode 3 is regulated through connectors 30 and 32, leading from its welding head to the arc control device 34. This device has leads 36 and 38 connected, respectively, to the electrode 3 and the work 40 so that the voltage of the arc between the electrode 3 and the work 40 may be maintained within predetermined limits by appropriate increase or decrease in the rate of feed of the electrode through the welding head 14. The arc control device 34 is connected by leads 42 and 44 to a source of power. The arcs between the remaining electrodes 2 and 1 and the work 40 are independently regulated by similar control devices, the electrodes being supplied from the reels 50—52 which are rotatably supported by the traversing carriage at an elevated position, as indicated in the drawings. Each automatic arc control is supplied with 220 volt alternating current which is half-wave rectified to drive the 220 volt D. C. electrode feed motor 26. The controls are so adapted that the arc voltage may be set at any point from 25 to 40 volts.

From Fig. 10, it will be noted that the welding circuit may be connected in either 60° or 120° phase relationships. In the 120° system, the phase relationships are symmetrical and for the 60° system the center or Y" lead (see Fig. 10) is reversed (or, in other words, leads X" and Y" on the transformer 61 are reversed) giving a 60° relationship.

Power for the multiple arc apparatus is furnished by two 100 k. v. a. distribution transformers 54 and 56 connected in open delta to transform the 2300 volt, 3-phase power of the line elements X Y, Z, of Fig. 10 to the 3-phase 220 volt current of the lines X', Y', and Z'.

Between the electrodes 1, 2, and 3 and the line elements X', Y', and Z' are three 750 ampere welders 60, 61, 62 each involving a transformer with a 220-volt primary and an 80 or 100 volt secondary with a variable reactance in series. Between the respective welding transformers 60, 61, 62 and the electrodes 1, 2, and 3 are the contactor control boxes 66, 67, and 68.

One terminal of the secondary of each of the transformers 60, 61, 62 is connected with the work 40 by conductors such as those indicated at 70, 71, 72 in Fig. 10, and the other terminal of each secondary is connected through one of the contactor control boxes with one of the electrodes. The latter connections may be effected by such conductors as those indicated at 75, 76, 77, 78, 79, and 80. Separate volt-meters 85, 86, and 87 are connected between the conductor 73 and the separate lines leading to the separate electrodes 1, 2, and 3. Such volt-meters are also indicated as similarly connected in the hook-ups indicated in Figs. 4 and 7 of the drawings.

The current supplied to the separate electrodes and their arcs is, in operation, continuously indicated by ammeters 90—92 connected into the separate electrode circuits, as also indicated in Figs. 4 and 7. Such instruments may be, for convenience, secured to a panel fixed to drive carriage 8.

As indicated in Figs. 1 and 2, the drive carriage 8 includes a horizontal platform 100 upon which there are supports 102 and 104 for the separate electrode reels 50, 51, and 52. This platform also carries the speed ranger 12 which includes an electric motor and variable speed transmission operating a pinion 110 meshing with the teeth of a rack 112 fixed to the support 10.

The drive carriage 8 and its pertinent devices overhang the fixed support or guide 10 to considerable extent, and for this reason the carriage has a downward extension 120 which rotatably supports a guide roller 122 contacting the lower edges of the support 10 as indicated in Fig. 2.

The platform 100 has fixed thereto a vertical ram bracket 124 having vertical bores for receiving the upright vertical rods or rams 126. Preferably there are two of the brackets 124 and two rams 126 fixedly connected at their lower ends by a horizontal ram bracket 128, this construction supporting the welding heads and their control mechanisms for vertical and horizontal adjustments with reference to the platform 100. Vertical adjustment of the welding heads may be effected by means of the hand wheel 130 which rotates the shaft 132 to cause the ram 126 to move vertically in the brackets 124. The upper part of the shaft 132 is screw-threaded as indicated in Fig. 1, and is threaded through an intermediate part of the bracket 124. Below this part of the shaft there may be a collar fixed against movement longitudinally of the shaft and against movement vertically with respect to the horizontal ram bracket 128.

In the lower part of the horizontal ram bracket 128 there may be two horizontal bores for slidably receiving horizontal rams such as that shown at 134. The outer ends of the rams 134 are rigidly joined by a head slide 136 to which the inner welding head brackets 138—140 are adjustably secured.

Outer welding head brackets such as that indicated at 142 are secured to the inner brackets 138—140 so as to be adjustable about the horizontal axes of the worm gears 144 each of which is fixed to an outer bracket 142. The outer end of each bracket 142 is forked so as to provide journal supports for one of the trunnions 146. This arrangement provides supports for the welding heads 14, 16, and 18 and enables each of the welding heads to be swung about the axis of a trunnion 146 by an adjuster 148. For rotatably adjusting each of the welding heads and its bracket 142 about the axis of the worm wheel 144, there is an adjusting wheel 154 for each welding head, and after any such adjustment is made, the pertinent welding head is locked in its adjusted position by swinging one of the clamping levers 156—158 to its locking position.

Each of the welding heads 14, 16, and 18 carries a leveling pass construction 160 having journaled therein guide rollers 162 and 164 for the associated electrode.

Figure 3:
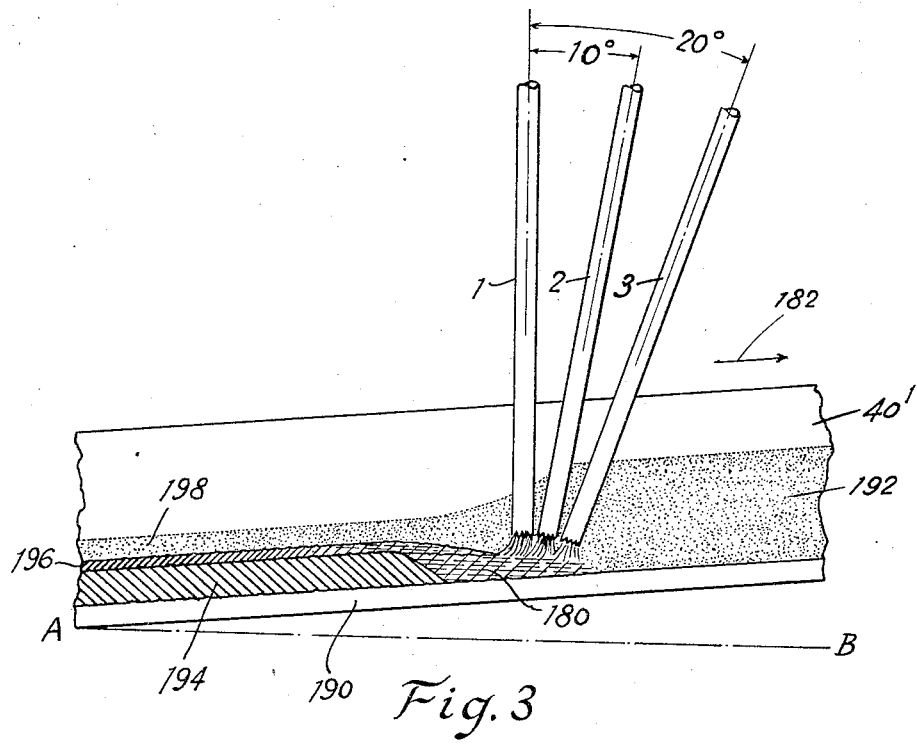
Fig. 3 is a vertical section through a weld zone of the multiple phase-spaced metallic arcs.

For causing the electrodes 1, 2, and 3, their arcs, and the welding heads to move through an inclined path parallel to the work and the bottom of the welding groove as they are indicated in Fig. 3, the drive carriage is provided with a combination motor and speed ranger 170 for rotating the shaft 132 through the gears 172 and 174. The speed at which the shaft 132 is operated is coordinated with the advance of the entire drive carriage along the fixed guide or support 10, to produce the required inclined path of movement.

To enhance the inherent characteristics of the illustrative multiple arc method to dam up the molten weld metal to a high degree and to prevent the pool from running ahead of the arc, the method may be practiced with the work inclined to the horizontal AB, as indicated in Fig. 3. The electrodes 2 and 3 are also inclined to enhance these same desirable results. For instance, the electrode 1 is shown vertically arranged and the electrode 2 inclined rearwardly and downwardly toward the pool 189 with its axis at 10° to the axis of the electrode 1. The leading electrode 3 is further inclined so its axis is at an angle of 20° to the axis of the electrode 1.

In the method illustrated in Fig. 3 relative movement of the electrodes and the work 40' is such that the electrodes may be considered as welding uphill. When the work is fixed, the electrodes move in the direction of the arrow 182.

The illustrative method is also adapted for advantageous use with flux coated electrodes, and it is also used with improved results in the flux smothered type of welding. Its use in the latter is indicated in Fig. 3 of the drawings. Here, the base of the weld groove is indicated at 190, a layer of unfused welding flux at 192, and the solidified weld metal at 194. Above the latter is a stratum 196 of solidified or frozen flux which has previously been fused by the action of the arc. Above the stratum 196 is a layer 198 of granular flux which has not been changed by the process.

As compared to the results of welding with a single electrode, the practice of the illustrative method, with the use of three electrodes, effects more than three times the deposit of weld metal per unit of time. Thus, there is a considerable reduction of welding time for producing a given weld. Furthermore, the illustrative method increases the heat input per unit of length of weld seam, and thus decreases the rate of cooling and decreases the hardness difference in the metal of the weld zone or adjacent thereto. The danger of undesirable residual stress patterns in the metal is also reduced.

The illustrative method also effects single pass welding which eliminates trouble from undercutting or side-washing. By reason of the greater stability of the polyphase arc, the illustrative method is effected with a lower open circuit voltage and therefore with a correspondingly lower transformer rating in k. v. a.

The illustrative method also provides for superior slag holding properties by utilizing different voltages in the separate arcs. For instance, when the method is carried out with the leading arc at 25 volts, the middle arc at 30 volts, and the following arc at 35 volts, the slag holding properties of the method are considerably improved. The thermal efficiency of the method is high, and the method accomplishes a further reduction in overall welding time by reducing the time required for slag chipping and removal, and reducing set-up time.

The illustrative method involves the merging of the arcs into a common pool of weld metal, and coincidence of maximum magnetic effects in the arcs are avoided by placing the welding currents out of phase with each other. Under these conditions, the arc blow is reduced even when compared with the ordinary single phase A. C. arc, which is definitely superior to the D. C. arc.

The combined arc of the illustrative method is elongated so that the heat is distributed principally in the direction of travel or length of the welds. This permits a larger arc without increasing the width of the weld groove, a result which would not be possible if the increased rates of weld metal deposition were sought to be effected by the use of an equivalent single current in a single electrode of larger diameter. Thus less weld metal per inch length of groove is required.

With the electrode inclinations of the illustrative method, the slag is pushed backward, and supplies good coverage to protect the molten pool.

When welding in a groove with three electrodes in line it is necessary to provide sufficient width so that the slag may flow between the electrode and wall rather than through the arcs. The effect of the inclination is to afford a head differential between the leading and trailing edge of the arc so that the slag will flow toward and remain at the trailing end of the arc.

Fig. 4 is a diagrammatic view indicating the electrical characteristics of the welding system when the electrodes 1, 2, and 3 are in 60° phase relationship. The ground current may be indicated by an ammeter 200 connected into the ground cable 73 and the voltage across the lines 76 and 80 may be indicated by an instrument 202. The voltmeter 204 indicates the voltage across the lines 76—78, and the voltmeter 206 indicates the voltage across the lines 78 and 80.

In the operation of the system with the electrodes in 60° phase relation, as indicated in Figs. 4 and 5, the arcs between the work 40 and the electrodes 1, 2, and 3 are predominately attractive. This is indicated by the diagram of Fig. 6 and it has been proven by the visual evidence offered by the film of the arcs produced by a pin hole type of stroboscopic camera. The record thus produced in actual practice corresponds quite closely with the indications of the reaction curves 1A, 2A, and 3A of the Fig. 6 diagram. In this diagram, the curves or waves 1', 2', and 3' are for the respective electrodes with corresponding members. The curve 1A shows the reaction between the currents of electrodes 1 and 2 which are 60° apart. It will be noted that the major part of this curve indicates attractive characteristics of the arcs of electrodes 1 and 2.

The curve 2A represents the reaction between the currents 2' and 3' which are 60° apart. The major part of this curve also indicates the attractiveness of the arcs of electrodes 2 and 3. Curve 3A represents the reaction between the currents of electrodes 1 and 3 which are 120° apart and the major part of this curve, similar in degree to the above indicated parts of the other curves 1A and 2A, indicates the predominant repulsiveness of the arcs of electrodes 1 and 3. Thus, the predominating characteristic of the three arcs in combination is that the arcs are attractive.

The illustrative system and method, with the arcs in 60° phase relationship thus has the advantage that the arcs act more like a single arc. When coated electrodes are employed the slag is more effectively dammed and prevented from running ahead of the electrodes. This probably accounts, at least in part, for the superior results of the illustrative method with the 60° arrangement, particularly as regards porosity and slag inclusion. With the arcs in the 60° phase relationship, the concentrated pool of molten metal results in improved thermal conditions, involving slower cooling rates allowing more time for gas to escape. There is also improvement in the refinement of the weld metal by reason of its slower rate of solidification.

When the electrodes are arranged in the 120° phase relationship as indicated in Figs. 7 and 8 the arcs between the electrodes 1, 2, and 3 and the work 40 are predominately repulsive. However, with this arrangement the return ground current, indicated by the ammeter 210 (see Fig. 7), is zero which eliminates loss in the ground lead 73.

In the Fig. 7 hookup, the voltages indicated by the instruments 202, 204, and 206 will usually be of the same order.

In the Fig. 9 diagram, illustrating the currents for the electrodes in the 120° phase relationship, the curves 4, 5, and 6 illustrate the currents for the respective electrodes. They are 120° apart. The curve 4A represents the reaction between currents 4 and 5, and the curve 5A is the reaction between the currents 5 and 6. The curve 6A is the reaction between currents 4 and 6.

Since the electro-motive forces between the arc streams are predominantly repulsive, the overall arc zone tends to be longer (with the electrodes in the line of welding and phase-spaced 120°) and narrower than when the arcs are in 60° phase-spaced relationship.

With the system involving the electrodes in 120° phase relationship the maximum welding current obtainable from each welding transformer has been found to be 100 amperes higher than for the 60° hook-up due to the zero ground current of this arrangement, and the elimination of impedance drop in the ground lead 73.

When the illustrative method and system are utilized in the cladding of steel with an alloy, the latter is deposited over a wide path by the multiple electrodes preferably arranged in a row transverse to the direction of relative movement between the work (the steel body) and the electrodes. When a plurality of groups of the latter are employed a large area of steel is clad during each pass, the alloy from the electrodes being deposited under a layer of flux.

We claim:

1. In a method of arc welding, maintaining a plurality of metal fusing and metal depositing electric arcs along a weld zone, energizing the arcs from a single polyphase source, maintaining a uniform phase difference of less than 180° between the arcs, independently and continuously supplying weld metal to each arc as metal is fused thereby, co-ordinating relative movement between said arcs and the weld zone with the rate of fusion, and independently controlling the voltage of each arc.

2. In a method of arc welding, maintaining a plurality of metal fusing electric arcs merging into a common metallic pool in a weld zone, energizing the arcs from a single polyphase source of electrical energy, maintaining a uniform phase spacing of 60° between the arcs and thereby causing said arcs to be predominantly attractive, co-ordinating relative movement of the merging arcs and said pool along the weld zone with the rate of deposition of fused weld metal, and independently controlling the voltage of each arc.

3. In an arc welding system, a plurality of consumable metallic electrodes arranged in the line of welding, independently operating welding heads simultaneously feeding the electrodes toward their closely adjacent arcing ends disposed over the zone of a weld seam, means effecting relative movement of the welding heads and the weld zone to progressively produce a weld seam, the electrodes converging downwardly toward a common pool of fused weld metal with the leading electrode inclined downwardly and rearwardly toward the arcing end of a trailing electrode, a multiple phase electric system by which the electrodes and their merging arcs are in 60° phase-spaced relationship, and independent and automatic arc-voltage control for each electrode and its feeding means.

4. In an arc welding system, a plurality of downwardly convergent flux coated electrodes normally having arcs merging in a common weld metal pool, independently operating welding heads simultaneously feeding the electrodes toward their closely adjacent arcing ends disposed along a weld seam zone, a multiple phase electric system by which the electrodes and their merging arcs are maintained in phase-spaced relationship, independent arc-voltage control for each electrode and its welding head feeding means, traversing means causing progression of the arc welding along a weld seam, and means maintaining the leading electrode inclined downwardly and rearwardly toward the common arcing zone at an acute angle to the trailing electrode.

5. In a multiple metallic arc welding system, granular weld flux at least partially filling a groove in which the weld is to be made, three independently controlled metallic electrodes converging downwardly and arranged in succession along a single weld line along said groove, traversing means for effecting relative motion between the deposited weld metal and the electrodes, means maintaining the trailing electrode substantially normal to the line of the weld and maintaining the remaining electrodes inclined downwardly and rearwardly toward the arcing end of the trailing electrode and at successively smaller angles thereto, means including a three phase electric system causing said electrodes to form 60° phase-spaced arcs merging in the same metallic pool in said groove and beneath said flux, independently operable welding heads for advancing the electrodes toward said pool, and independent arc-voltage controls for the separate arcs and the separate welding heads.

6. In a method of arc welding, simultaneously maintaining a plurality of phase-spaced metal fusing and depositing electric arcs along a weld zone, causing relative movement between said arcs and the work, independently and continuously supplying weld metal to each arc, and maintaining the voltages of the arcs at increasing values from the leading arc to the trailing arc by independently controlling the voltage of each arc.

7. In a method of arc welding, maintaining a plurality of metal fusing and phase-spaced electric arcs merging into a common metallic pool in a weld zone, energizing the arcs from a single polyphase source of electrical energy, maintaining a uniform phase spacing of 60° between the arcs and thereby causing said arcs to be predominantly attractive, independently controlling the voltage and length of each arc to maintain them at predetermined values increasing from the leading arc to the trailing arc, and causing relative movement of the merging arcs and the work to effect progression of the welding action along a welding zone.

8. In a multiple arc welding system, granular weld flux at least partially filling a groove for the weld, three independently controlled metallic electrodes in line lengthwise of the groove, means including a three phase electric system causing said electrodes to form phase-spaced arcs merging in the same metallic pool in said groove and beneath said flux, said means including Y separate phase connections for the separate electrodes and other electrical connections to a terminal for each arc and independently operable welding heads feeding the electrodes convergently toward said pool, means causing relative movement between the deposited weld metal and the electrodes longitudinally of the groove to effect progression of the welding along the groove, the leading electrode being inclined downwardly and rearwardly toward the pool while the trailing electrode is closer to a position normal to the line of welding, and independent arc-voltage controls for the separate welding heads.

9. In an arc welding system, a plurality of consumable flux coated metallic electrodes, independently operable welding heads simultaneously and independently feeding the electrodes toward their closely adjacent arcing ends disposed over the zone of a weld seam, a three phase electric system including a Y polyphase connection by which the electrodes and their merging arc are in a 60° phase-spaced relationship, and independent arc-voltage control means for each electrode and its feeding means.

10. In a method of cladding steel by arc welding, simultaneously maintaining a plurality of phase-spaced metal fusing and depositing electric arcs closely spaced in a zone transverse to the cladding progress, causing relative movement between said arcs and the steel, independently and continuously supplying weld metal to each arc as the cladding progresses, and independently controlling the voltage of each arc by varying the rate of supply of weld metal thereto.

ISAAC HARTER.
EVAN F. WILSON.
ERNEST C. HUGE.

REFERENCES CITED

The following references are of record in the file of this patent:

UNITED STATES PATENTS

| Number | Name | Date |
| --- | --- | --- |
| 1,340,056 | Kenyon | May 11, 1920 |
| 1,498,903 | Bennett | June 24, 1924 |
| 2,191,469 | Hopkins | Feb. 27, 1940 |
| 1,371,094 | Holslag | Mar. 8, 1921 |
| 2,191,482 | Hopkins | Feb. 27, 1940 |

Certificate of Correction

Patent No. 2,436,387.

February 24, 1948.

ISAAC HARTER ET AL.

It is hereby certified that errors appear in the printed specification of the above numbered patent requiring correction as follows:

Column 2, line 1, for the numeral "15" read *16*; line 2, same column, for the words "mounted to" read *mounted on*; column 5, line 64, for "members" read *numbers*; column 8, line 17, claim 7, for "welding" read *weld*; line 47, same column, claim 9, for "arc" read *arcs*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*